United States Patent
Taguchi et al.

(10) Patent No.: US 8,289,480 B2
(45) Date of Patent: Oct. 16, 2012

(54) LIQUID CRYSTAL DISPLAY DEVICE

(75) Inventors: Tokio Taguchi, Tenri (JP); Kazuhiko Tsuda, Ikoma-gun (JP); Mutsumi Nakajima, Nara (JP); Keisuke Yoshida, Matsusaka (JP); Junichi Yamada, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 138 days.

(21) Appl. No.: 12/970,022

(22) Filed: Dec. 16, 2010

(65) Prior Publication Data

US 2011/0085101 A1    Apr. 14, 2011

Related U.S. Application Data

(63) Continuation of application No. 12/293,221, filed as application No. PCT/JP2007/052962 on Feb. 19, 2007, now Pat. No. 7,880,834.

(30) Foreign Application Priority Data

Mar. 17, 2006 (JP) ................................. 2006-075083

(51) Int. Cl.
*G02F 1/1335* (2006.01)

(52) U.S. Cl. .......................... 349/106; 349/107; 349/108

(58) Field of Classification Search ........... 349/106–108
See application file for complete search history.

(56) References Cited

U.S. PATENT DOCUMENTS

| | | | |
|---|---|---|---|
| 4,800,375 A | 1/1989 | Silverstein et al. | |
| 6,195,140 B1 | 2/2001 | Kubo et al. | |
| 6,710,825 B2 | 3/2004 | Kubo et al. | |
| 6,862,062 B2 | 3/2005 | Kubo et al. | |
| 7,136,124 B2 | 11/2006 | Yeh et al. | |
| 7,616,277 B2 | 11/2009 | Jang et al. | |
| 2004/0174389 A1 | 9/2004 | Ben-David et al. | |
| 2005/0122294 A1 | 6/2005 | Ben-David et al. | |
| 2005/0275769 A1 | 12/2005 | Roh et al. | |
| 2006/0039152 A1 | 2/2006 | Ito | |

FOREIGN PATENT DOCUMENTS

| | | |
|---|---|---|
| JP | 9-251160 | 9/1997 |
| JP | 2001-209047 | 8/2001 |
| JP | 2001-306023 | 11/2001 |
| JP | 2004-151202 | 5/2004 |

OTHER PUBLICATIONS

Pointer, M. R., "The Gamut of Real Surface Colours", Color Research and Application, vol. 3, No. 5, pp. 145-155, (1980).
Yang, Y.C. et al., "31.1: Development of Six Primary-Color LCD", SID05 Digest, pp. 1210-1213, (May 25, 2005).

(Continued)

*Primary Examiner* — Phu Vu
(74) *Attorney, Agent, or Firm* — Nixon & Vanderhye, P.C.

(57) ABSTRACT

A liquid crystal display device comprises plural picture elements including a first picture element and a second picture element; plural switching elements; and plural scanning lines. The plural switching elements include a first switching element electrically connected to the first picture element and a second switching element electrically connected to the second picture element. The plural scanning lines include a first scanning line electrically connected to the first switching element and a second scanning line electrically connected to the second switching element. The second scanning line is located between at least part of the first picture element and the first scanning line. The first scanning line is located between at least part of the second picture element and the second scanning line.

22 Claims, 12 Drawing Sheets

OTHER PUBLICATIONS

Chino, E. et al., "25:1: Invited Paper: Development of Wide-Color-Gamut Mobile Displays with Four-primary-color LCDs", SID 06 Digest, pp. 1221-1224, (Jun. 7, 2006).

FPD International 2005 Forum, "Improving LCD TV Color using Multi-Primary Technology", 65 pages, (Oct. 19, 2005).

International Search Report for PCT/JP2007/052962, mailed May 15, 2007.

English translation of the International Preliminary Report on Patentability mailed Oct. 30, 2008 in corresponding PCT Application No. PCT/JP2007/052962.

Pointer, M. R., "The Gamut of Real Surface Colours", Color Research and Application, vol. 5, No. 3, pp. 145-155, (1980).

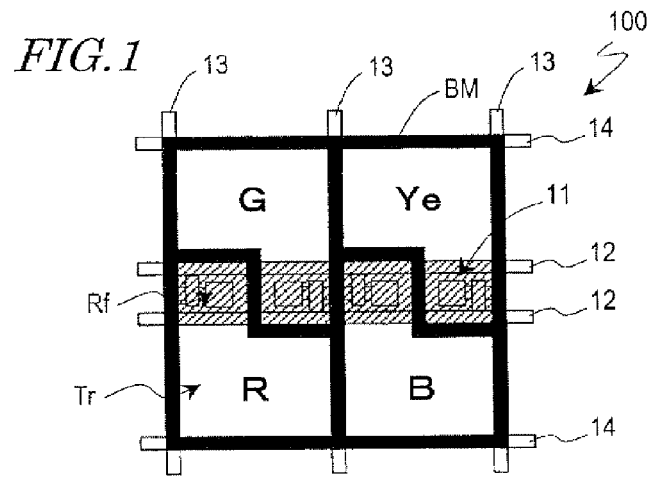
FIG.1
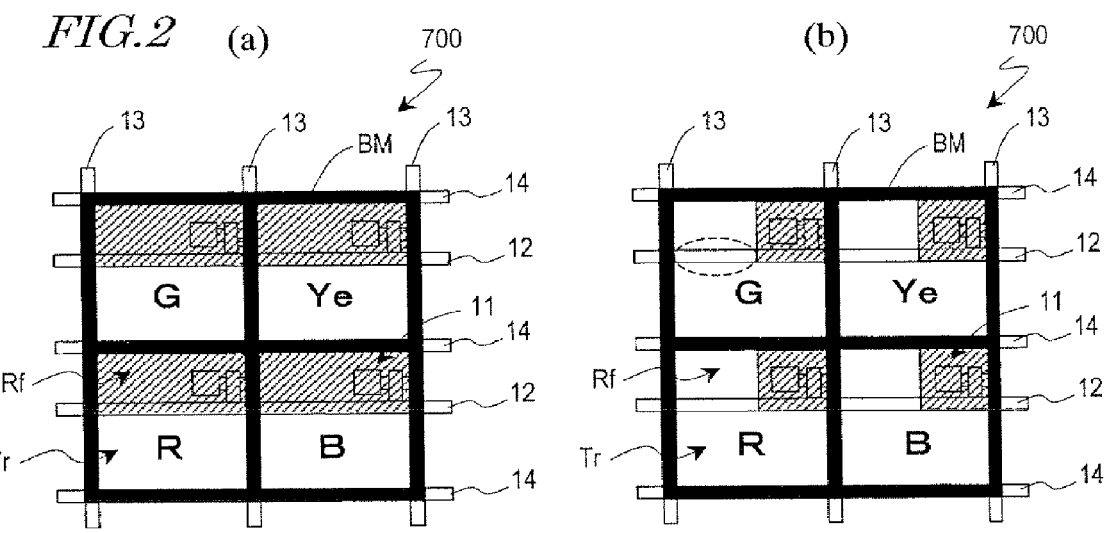
FIG.2 (a)  (b)
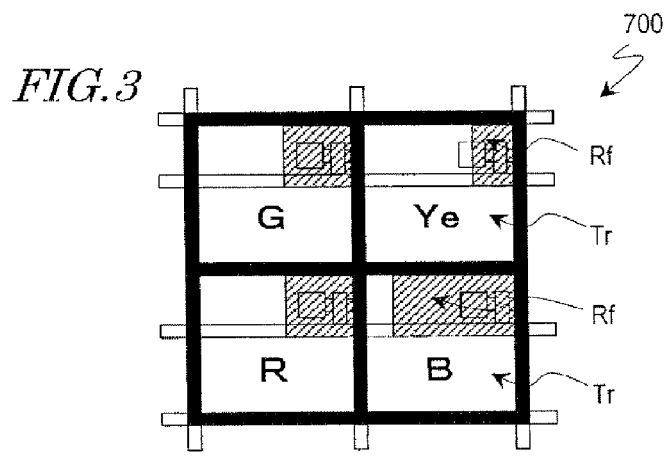
FIG.3

FIG.9
(a)
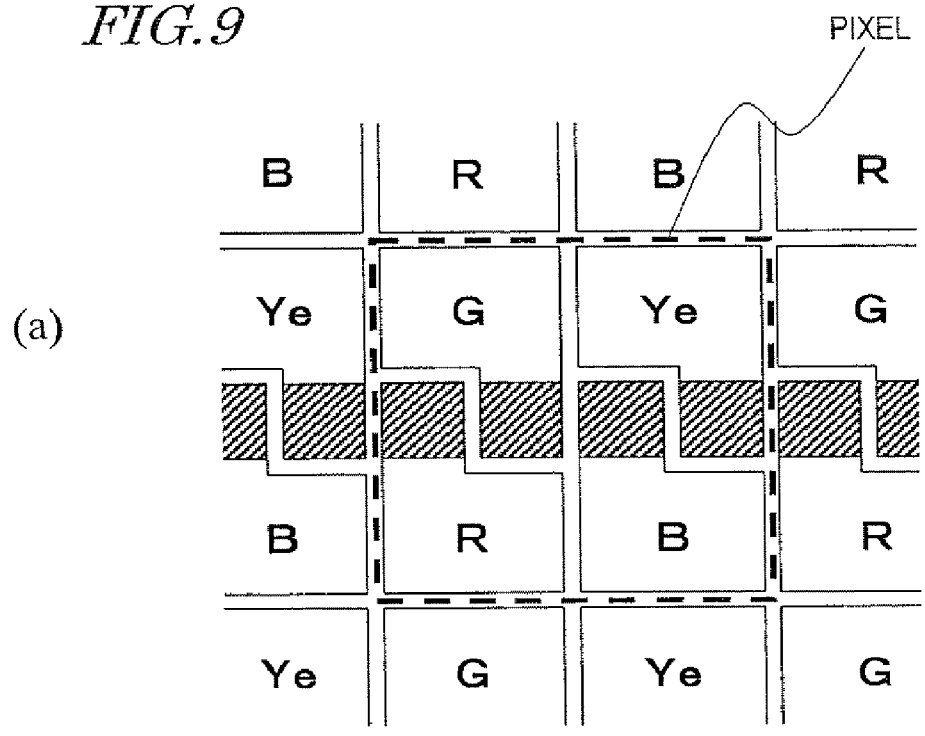
(b)
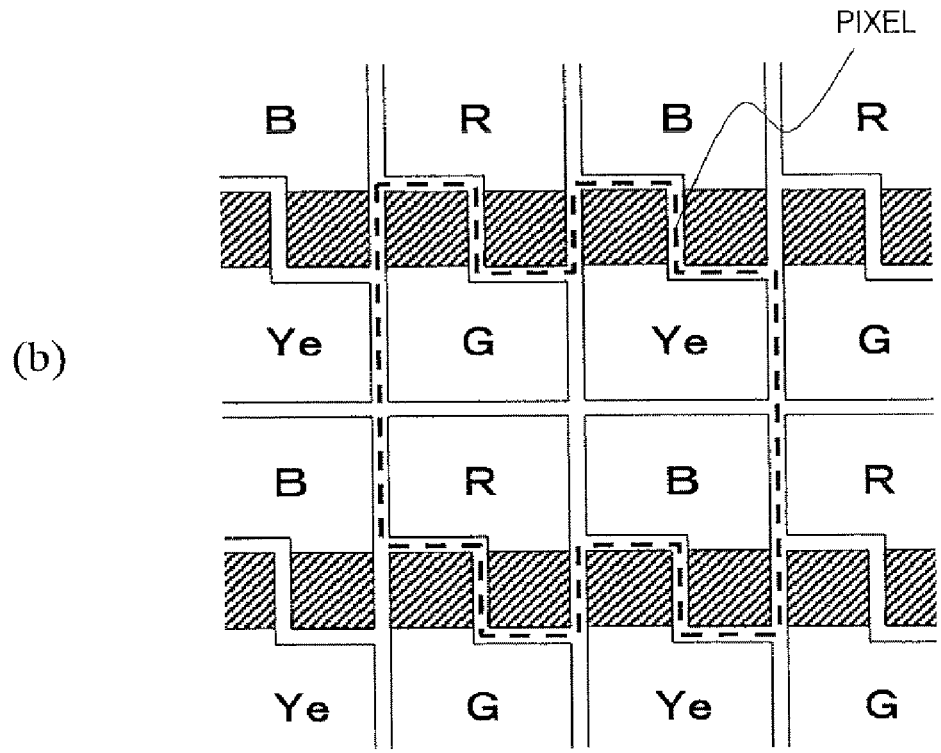

(a)                      (b)

FIG. 15
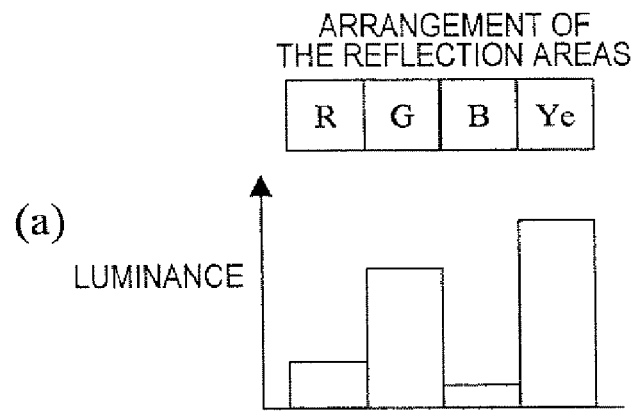
(a)
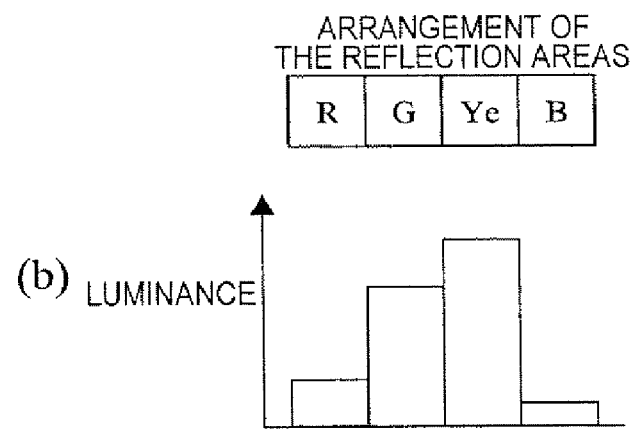
(b)
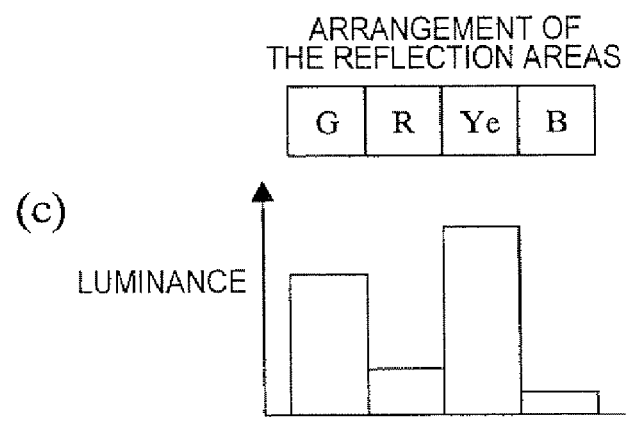
(c)

LIQUID CRYSTAL DISPLAY DEVICE

This application is a continuation application of U.S. patent application Ser. No. 12/293,221 filed Sep. 16, 2008 now U.S. Pat. No. 7,880,834, which is the U.S. national phase of International Application No. PCT/JP2007/052962, filed 19 Feb. 2007, which designated the U.S. and claims priority to Japan Application No. 2006-075083 filed 17 Mar. 2006, the entire contents of each of which are hereby incorporated by reference.

TECHNICAL FIELD

The technology disclosed herein relates to a liquid crystal display device providing color display, and specifically to a transreflective liquid crystal display device capable of providing display both in a transmission mode and a reflection mode.

BACKGROUND ART

Currently, liquid crystal display devices (hereinafter, also referred to simply as "LCDs") are used for various applications. In general LCDs, one pixel is formed of three picture elements respectively for providing display in red, green and blue, which are three primary colors of light, and thus color display can be provided.

However, conventional LCDs have a problem that the range of colors which can be displayed (referred to as the "color reproduction range") is narrow. FIG. 18 shows a color reproduction range of a conventional LCD which provides display using the three primary colors. FIG. 18 is an xy chromaticity diagram of an XYZ color representation system, in which a triangle having, as apexes, three points corresponding to the three primary colors of red, green and blue represents the color reproduction range. In the figure, colors of various objects existent in the natural world which were found by Pointer are plotted with "x" (see Non-patent Document No. 1). As understood from FIG. 18, there are colors of objects which are not encompassed in the color reproduction range. An LCD providing display using the three primary colors cannot display a part of the colors of objects.

In order to enlarge the color reproduction range of LCDs, techniques for increasing the number of primary colors usable for display to four or greater have been proposed.

For example, as shown in FIG. 19, Patent Document 1 discloses an LCD 800 in which one pixel P is formed of six picture elements R, G, B, Ye, C and M respectively for displaying red, green, blue, yellow, cyan and magenta. FIG. 20 shows the color reproduction range of the LCD 800. As shown in FIG. 20, the color reproduction range represented by a hexagon having, as apexes, six points corresponding to six primary colors encompasses substantially all the colors of objects. In this way, the color reproduction range can be enlarged by increasing the number of primary colors.

Patent Document 1 also discloses an LCD in which one pixel is formed of four picture elements for displaying red, green blue and yellow, and an LCD in which one pixel is formed of five picture elements for displaying red, green blue, yellow and cyan. By using four or more primary colors, an LCD can enlarge the color reproduction range as compared to the conventional LCD providing display using the three primary colors. In this specification, LCDs providing display using four or more primary colors will be collectively referred to as a "multiple primary color liquid crystal display device (or multiple primary color LCD)".

On the other hand, LCDs capable of providing high quality display both outdoors and indoors have been proposed (for example, Patent Document 2). Such LCDs are referred to as "transreflective LCDs" and have a reflection area for providing display in a reflection mode and a transmission area for providing display in a transmission mode in one pixel.

FIG. 21 shows an example of a transreflective LCD. An LCD 900 shown in FIG. 21 has a pixel defined by three picture elements R, G and B respectively for displaying red, green and blue.

The three picture elements R, G and B each have a transmission area Tr for providing display in a transmission mode and a reflection area Rf (hatched in the figure) for providing display in a reflection mode. Typically, the reflection area Rf accommodates a reflective electrode formed of a conductive material having a high light reflectance such as aluminum or the like. By contrast, the transmission area Tr accommodates a transmissive electrode formed of a conductive material having a high light transmittance such as ITO or the like.

The area size ratio of the transmission area Tr and the reflection area Rf is determined based on which mode of display, i.e., the transmission mode or the reflection mode, is prioritized and to which degree. As the transmission mode of display is more prioritized, the area size of the transmission area Tr is set to be larger; whereas as the reflection mode of display is more prioritized, the area size of the reflection area Rf is set to be larger. From the viewpoint of improving the indoor display quality, the transmission mode of display needs to be prioritized and the area size of the transmission area is set to be larger.

The reflective electrode and the transmissive electrode are switched to each other by a thin film transistor 11 provided in each picture element. The thin film transistor 11 is supplied with a scanning signal from a scanning line 12 and is supplied with a video signal from a signal line 13. A storage capacitance line 14 is provided so as to extend parallel to the scanning line 12. In an area outside the picture elements, a lattice-shaped (or stripe-shaped) light shielding layer (referred to as "black matrix") BM is provided.

The lines and the transistors 11 are formed of a light shielding material and therefore decrease the ratio of an area actually contributing to display (referred to as "aperture ratio") in a liquid crystal panel. However, in the case where the line extending across the picture elements (in this example, the scanning line 12) and the thin film transistors 11 are located within the reflection area Rf as shown in FIG. 21, the aperture ratio is improved and bright display is realized.

Patent Document 1: Japanese PCT National-Phase Laid-Open Patent Publication No. 2004-529396
Patent Document 2: Japanese Laid-Open Patent Publication No. 11-101992
Non-patent Document 1: M. R. Pointer, "The gamut of real surface colors," Color Research and Application, Vol. 5, No. 3, pp. 145-155 (1980)

DISCLOSURE

Problems to be Solved

However, for LCDs in which one pixel is defined by four or more picture elements such as multiple primary color LCDs, a structure optimum for a transreflective system has not been found. As the number of picture elements included in one pixel increases, the number of lines and thin film transistors also increases and so the aperture ratio decreases. Therefore, when a structure of a transreflective LCD for providing display with three primary colors as shown in FIG. 21 is applied to a multiple primary color LCD as it is, the luminance decreases. The aperture ratio can be maintained at a relatively high level by locating the lines extending across the picture elements or the thin film transistors in the reflection area. However, when such a structure is adopted, the area size of the reflection area cannot be made smaller than a certain level, and accordingly, the area size of the transmission area cannot be made much larger. Hence, it is difficult to improve the indoor display quality.

The technology disclosed herein, made in light of the above-described problems, has an object of, in a transreflective liquid crystal display device in which one pixel is defined by four or more picture elements, realizing a structure which provides a high aperture ratio and is suitable for display for which the transmission mode is prioritized.

Means for Solving the Problems

A liquid crystal display device according to the technology disclosed herein is a liquid crystal display device, comprising a plurality of picture elements including a first picture element, a second picture element, a third picture element and a fourth picture element for displaying different colors from one another; in which each of the plurality of picture elements includes a transmission area for providing display in a transmission mode and a reflection area for providing display in a reflection mode. Each of the plurality of picture elements includes a mesh portion shaped to be meshable with an adjacent picture element; and the reflection area of each of the plurality of picture elements is located in the mesh portion. Thus, the above-described objective is achieved.

In one example embodiment, the plurality of picture elements are each L-shaped.

In one example embodiment, the plurality of picture elements define a plurality of pixels each including the first picture element, the second picture element, the third picture element and the fourth picture element; and the mesh portion of each of the plurality of picture elements meshes with a picture element belonging to the same pixel.

In one example embodiment, the plurality of picture elements define a plurality of pixels each including the first picture element, the second picture element, the third picture element and the fourth picture element; and the mesh portion of each of the plurality of picture elements meshes with a picture element belonging to a different pixel.

In one example embodiment, the first picture element is a red picture element for displaying red, the second picture element is a green picture element for displaying green, and the third picture element is a blue picture element for displaying blue.

In one example embodiment, the fourth picture element is a white picture element for displaying white.

In one example embodiment, among the first picture element, the second picture element, the third picture element and the fourth picture element, two picture elements display colors in a complementary relationship to each other; and the mesh portions of the two picture elements mesh with each other.

In one example embodiment, the fourth picture element is a yellow picture element for displaying yellow.

In one example embodiment, the mesh portion of the blue picture element and the mesh portion of the yellow picture element mesh with each other.

In one example embodiment, the reflection area of the blue picture element has a larger area size than an area size of the reflection area of the yellow picture element.

In one example embodiment, the red picture element, the green picture element, the blue picture element and the yellow picture element are arranged in a matrix of 2 rows and 2 columns; and the mesh portion of the red picture element, the mesh portion of the green picture element, the mesh portion of the blue picture element and the mesh portion of the yellow picture element are arranged to be continuous like a strip in a row direction.

In one example embodiment, the mesh portions arranged to be continuous like a strip are continues in the order of the mesh portion of the red picture element, the mesh portion of the green picture element, the mesh portion of the blue picture element and the mesh portion of the yellow picture element; or in the order of the mesh portion of the green picture element, the mesh portion of the red picture element, the mesh portion of the yellow picture element and the mesh portion of the blue picture element.

In one example embodiment, the mesh portions arranged to be continuous like a strip are continues in the order of the mesh portion of the red picture element, the mesh portion of the green picture element, the mesh portion of the yellow picture element and the mesh portion of the blue picture element.

In one example embodiment, the liquid crystal display device according to the technology disclosed herein includes an active matrix substrate including a switching element provided for each of the plurality of picture elements; and the switching element is located in the reflection area of each of the plurality of picture elements.

Effects of the Technology

According to the technology disclosed herein, a structure for a transreflective liquid crystal display device in which one pixel is defined by four or more picture element, the structure providing a high aperture ratio and being suitable for display for which the transmission mode is prioritized, can be realized.

BRIEF DESCRIPTION OF THE DRAWINGS

FIG. 1 is a plan view schematically showing an LCD 100 according to an example embodiment.

FIGS. 2(a) and (b) are each a plan view schematically showing an LCD 700 as a comparative example.

FIG. 3 is a plan view schematically showing the LCD 700 as a comparative example.

FIG. 9(a) shows a structure in which a mesh portion of each picture element meshes with a picture element belonging to the same pixel, and (b) shows a structure in which a mesh portion of each picture element meshes with a picture element belonging to a different pixel.

FIGS. 15(a), (b) and (c) show the relationship between the order of arrangement of the reflection areas in the picture elements and the luminance of the picture elements.

DESCRIPTION OF THE REFERENCE NUMERALS

Figure 4:
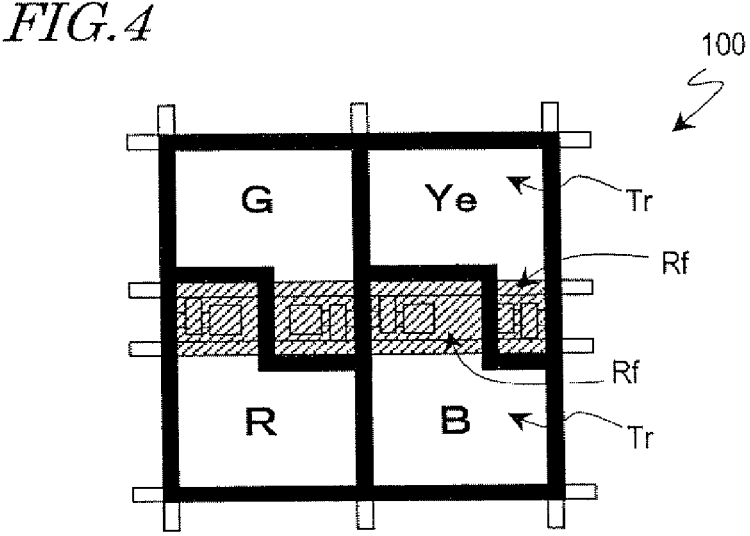
FIG. 4 is a plan view schematically showing the LCD 100 according to an example embodiment.

| | |
|---|---|
| 10 | Insulating plate |
| 11 | Thin film transistor (TFT) |
| 12 | Scanning line |
| 13 | Signal line |
| 14 | Storage capacitance line |
| 15 | Basecoat film |
| 16 | Semiconductor layer |
| 17 | Storage capacitance electrode |
| 18 | Storage capacitance connection line |
| 19 | Gate insulating film |
| 20 | Gate electrode |
| 21 | First interlayer insulating film |
| 22 | Source electrode |
| 23 | Drain electrode |
| 24 | Second interlayer insulating film |
| 25 | Picture element electrode |
| 25a | Transparent electrode |
| 25b | Reflective electrode |
| 26 | Alignment film |
| 27 | Conductive member |
| 30 | Insulating plate |
| 31R, 31G, 31B, 31Ye | Color filter |
| 32 | Transparent dielectric layer |
| 33 | Counter electrode |
| 34 | Alignment film |
| 35 | Projection (rivet) |
| 40 | Liquid crystal layer |
| 100a | Active matrix substrate (TFT substrate) |
| 100b | Counter substrate |
| 100 | Liquid crystal display device (LCD) |
| R | Red picture element |
| G | Green picture element |
| B | Blue picture element |
| Ye | Yellow picture element |
| Tr | Transmission area |

-continued

DESCRIPTION OF THE REFERENCE NUMERALS

| | |
|---|---|
| Rf | Reflection area |
| BM | Black matrix |
| CH | Contact hole |

DETAILED DESCRIPTION

Hereinafter, example embodiments of the technology disclosed herein will be described with reference to the drawings. The technology disclosed herein is not limited to the following embodiments.

Embodiment 1

FIG. 1 schematically shows a liquid crystal display device (LCD) 100 according to this embodiment. The LCD 100 has a plurality of picture elements including four types of picture elements respectively for displaying different colors from each other.

As shown in FIG. 1, the LCD 100 specifically includes a red picture element R for displaying red, a green picture element G for displaying green, a blue picture element B for displaying blue, and a yellow picture element Ye for displaying yellow. These four picture elements define one "pixel". In this embodiment, the red picture element R, the green picture element G, the blue picture element B and the yellow picture element Ye are arranged in a matrix of 2 rows and 2 columns in one pixel. The LCD 100 uses a larger number of primary colors for display than a general LCD which provides display using three primary colors, and therefore has a larger color reproduction range.

The red picture element R, the green picture element G, the blue picture element B and the yellow picture element Ye each have a transmission area Tr for providing display in a transmission mode and a reflection area Rf (hatched area in the figure) for providing display in a reflection mode. In the transmission area Tr, display is provided using light from an illumination device (backlight); whereas in the reflection area Rf, display is provided using ambient light (external light).

Typically, the reflection area Rf accommodates a reflective electrode for reflecting light, and the transmission area Tr accommodates a transparent electrode for transmitting light. The reflective electrode is formed of a conductive material having a high light reflectance such as aluminum or the like. The reflective electrode is formed of a conductive material having a high light transmittance such as ITO or the like.

It is preferable that the reflection area Rf and the transmission area Tr are different in the thickness of the liquid crystal layer (cell gap). Specifically, it is preferable that the thickness of the liquid crystal layer is smaller in the reflection area Rf than in the transmission area Tr. More specifically, the thickness of the liquid crystal layer in the reflection area Rf is preferably about ½ of that in the transmission area Tr. Light incident on the transmission area Tr from the backlight side passes through the liquid crystal layer only once, whereas light incident on the reflection area Rf from the observer side passes through the liquid crystal layer twice. By making the cell gap of the reflection area Rf smaller than that of the transmission area Tr (such a structure is referred to as a "multi-gap structure") as described above, the difference in retardation caused by the difference in the number of times that light passes through the liquid crystal layer can be decreased. As a result, the display quality is improved.

In order to realize the multi-gap structure, at least one of a pair of substrates facing each other with the liquid crystal layer located between has a step. The step can be provided by selectively forming a transparent dielectric layer on a part of the substrate using a resin or the like.

The LCD 100 further includes thin film transistors (TFT) 11 each provided in one picture element, scanning lines 12 for supplying a scanning signal to the TFTs 11, and signal lines 13 for supplying a video signal to the TFTs 11. The TFT 11 acts as a switching element for switching the picture element electrode (typically, including the reflective electrode and the transmissive electrode). Herein, for the sake of convenience, the direction in which the scanning lines 12 extend is referred to as a "row direction" and the direction in which the signal lines 13 extend is referred to as a "column direction".

The LCD 100 includes storage capacitance lines 14 for forming a storage capacitance. The storage capacitance lines 14 are formed so as to extend substantially parallel to the scanning lines 12. In this embodiment, the storage capacitance lines 14 are provided outside the picture elements, whereas the scanning lines 12 are provided so as to extend across the picture elements. The scanning lines 12 extending across the picture elements and the thin film transistors 11 are located within the reflection area Rf in order to increase the aperture ratio. In an area outside the picture elements, a light shielding layer (referred to as "black matrix") BM is provided so as to surround each picture element.

Figure 21:
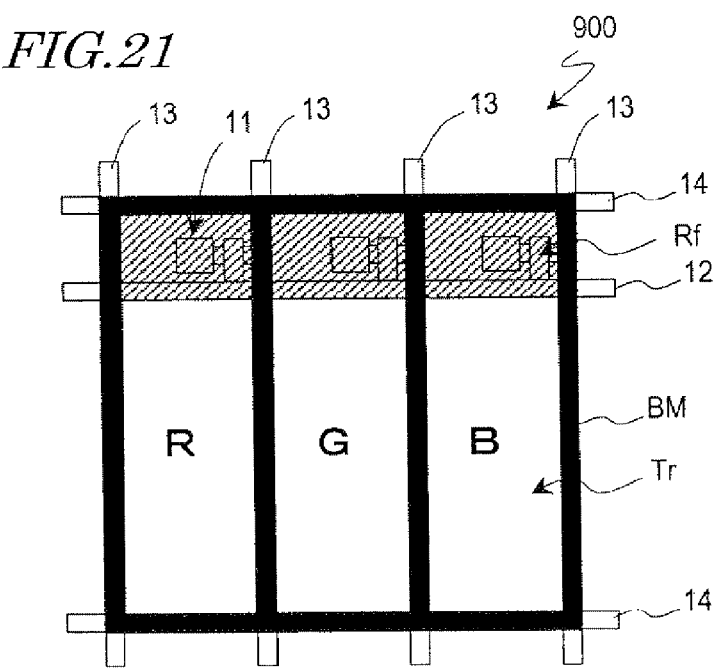
FIG. 21 is a plan view schematically showing a conventional transreflective LCD 900.

In a general LCD, as shown in FIG. 21, each picture element is rectangular. By contrast, the picture elements in the LCD 100 in this embodiment are each L-shaped, and two picture elements adjacent to each other in the column direction mesh with each other. Namely, each picture element has a portion shaped to be meshable with an adjacent picture element (referred to as a "mesh portion" in this specification). The reflection area Rf of each picture element is provided in the mesh portion thereof.

In this embodiment, the mesh portion of the red picture element R and the mesh portion of the green picture element G mesh with each other, and the mesh portion of the blue picture element B and the mesh portion of the yellow picture element Ye mesh with each other. The mesh portion of the red picture element R, the mesh portion of the green picture element G, the mesh portion of the blue picture element B and the mesh portion of the yellow picture element Ye are arranged continuously like a strip in the row direction. The reflection area Rf of the red picture element R, the reflection area Rf of the green picture element G, the reflection area Rf of the blue picture element B and the reflection area Rf of the yellow picture element Ye are also arranged continuously like a strip.

In the LCD 100 as described above, each picture element has a mesh portion shaped to be meshable with an adjacent picture element, and the reflection area of each picture element is located in the mesh portion. Owing to such a structure, display for which the transmission mode is prioritized can be realized while the aperture ratio is kept high. The reason for this will be described, hereinafter.

FIG. 2(a) shows an LCD 700 as a comparative example. The LCD 700 as a comparative example includes a red picture element R, a green picture element G, a blue picture element B and a yellow picture element Ye, but each picture element is rectangular and does not have any mesh portion.

In order to realize display for which the transmission mode is prioritized in the LCD 700, it is necessary to decrease the area size of the reflection area Rf and thus to increase the area size of the transmission area Tr. However, in order to keep the aperture ratio high, the lines, the TFT 11 and the like need to be provided in the reflection area Rf. Because there are limitations on the inter-line distances and the size of the TFTs 11, it is not possible to decrease the area size of the reflection area Rf infinitely.

For example, in FIG. 2(b), the width of each reflection area Rf in the row direction (the direction in which the scanning lines 12 extend) is decreased in order to forcibly decrease the area size of the reflection area Rf. In this case, only a part of the scanning line 12 extending across the picture element (represented with hatching in the figure) can be located in the reflection area Rf, and accordingly, the aperture ratio is decreased.

By contrast, in the LCD 100 shown in FIG. 1, each picture element includes a mesh portion shaped to be meshable with an adjacent picture element, and the reflection area Rf is located in the mesh portion. In this case, the area size of the reflection area Rf can be sufficiently decreased while accommodating the lines extending across the picture element and TFT 11. Accordingly, the area size of the transmission area Tr can be sufficiently increased, and thus the indoor display quality can be sufficiently improved.

With the structure shown in FIG. 2(b), the reflection areas Rf are located like islands. Therefore, when providing transparent dielectric layers for forming a multiple gap structure, alignment margins need to be taken into consideration both in the row direction and the column direction. By contrast, with the LCD 100 in this embodiment, the reflection area Rf is located in each mesh portion, and as a result, the reflection areas Rf are located continuously like a strip. Accordingly, the dielectric layers may also be formed continuously like a strip. Alignment margins do not need to be taken into consideration in the direction in which the dielectric layers are continuous. Therefore, the aperture ratio of the reflection areas Rf (reflection aperture ratio) can be improved.

In addition, the LCD 100 in this embodiment is also superior on the capability of realizing preferable white balance both in the transmission mode and the reflection mode. The reason for this will be described, hereinafter.

For providing display with four primary colors of red, green, blue and additionally yellow, white balance is likely to be destroyed. As a result, the displayed white color is yellowish (i.e., the color temperature of white is lowered). In transmission mode display, preferable white balance can be realized by adjusting the light source of backlight (specifically, by using a light source for emitting slightly bluish white light). In the reflection mode, however, ambient light is used for display and therefore, white balance cannot be adjusted in such a manner.

Thus, it is conceivable to adjust the white balance in the reflection mode by adjusting the area sizes of the reflection areas Rf. Specifically, by making the area size of the reflection area Rf of the blue picture element B larger than the area size of the reflection area Rf of the yellow picture element Ye, the white color in the reflection mode can be prevented from becoming yellowish.

However, adjusting the white balance in such a manner presents another problem. For example, it is assumed that from the LCD 700 shown in FIG. 2(b) as a comparative example, the area size of the reflection area Rf of the blue picture element B is increased and the area size of the reflection area Rf of the yellow picture element Ye is decreased. Then, as shown in FIG. 3, the area size of the transmission area Tr of the blue picture element B is made smaller than the area size of the transmission area Tr of the yellow blue picture element Ye. As a result, the white color in the transmission mode becomes yellowish. In order to prevent this, it is conceivable to replace the light source of the illumination device with a light source which emits further bluish light. However, when the light from the light source becomes more bluish, the luminance of the backlight is decreased.

By contrast, with the LCD 100 in this embodiment, the mesh portions of two picture elements for displaying colors in a complementary relationship to each other, i.e., the mesh portion of the blue picture element B and the mesh portion of the yellow picture element Ye mesh with each other. Therefore, by adjusting the area sizes of these mesh portions, as shown in FIG. 4, the area size ratio of the reflection area Rf of the blue picture element B and the reflection area Rf of the yellow picture element Ye can be changed without changing the area size ratio of the transmission area Tr of the blue picture element B and the transmission area Tr of the yellow picture element Ye (specifically, the area size of the reflection area Rf of the blue picture element B can be made larger than the area size of the reflection area Rf of the yellow picture element Ye). Therefore, the white balance in the reflection mode display can be adjusted without destroying the white balance in the transmission mode display. As a result, preferable white balance can be realized both in the transmission mode and the reflection mode.

Figure 5:
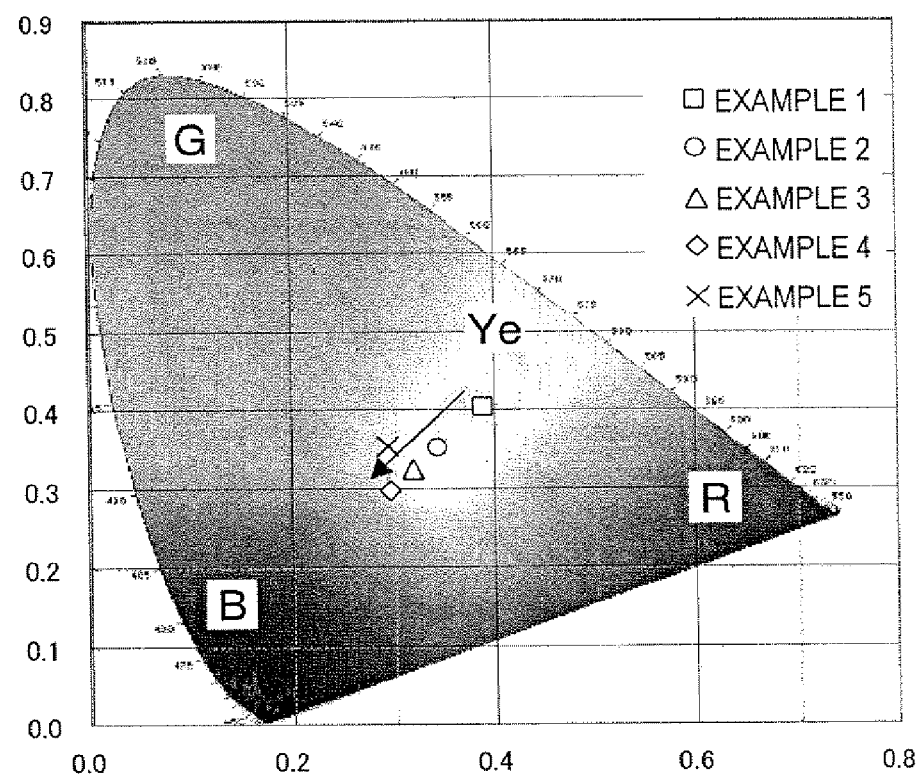
FIG. 5 is an xy chromaticity diagram in which white displayed in a reflection mode is plotted in Examples 1 through 5 in which white balance in the reflection mode display is adjusted by changing the area size of the reflection area.
Figure 6:
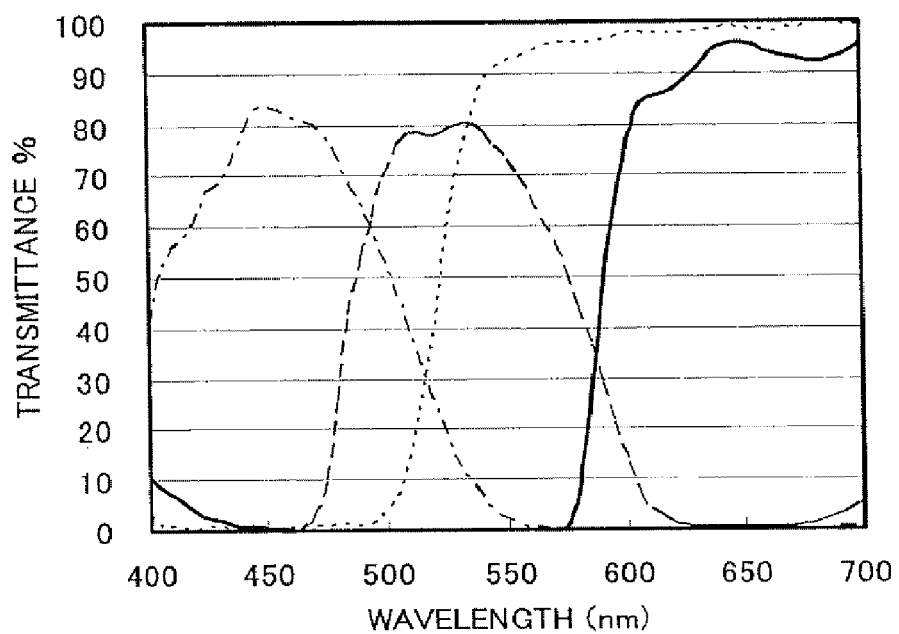
FIG. 6 is a graph illustrating the spectrum characteristic of a color filter.
Figure 7:
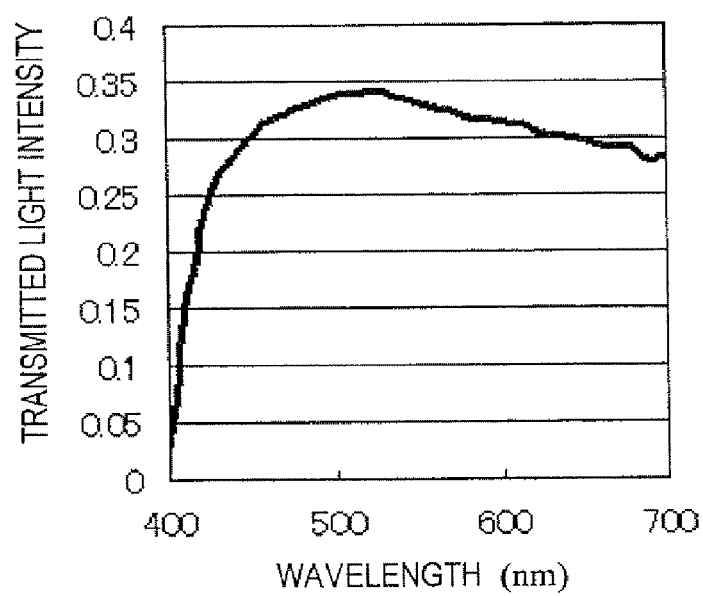
FIG. 7 is a graph illustrating the wavelength dependency of the intensity of light transmitted through a liquid crystal layer.
Figure 8:
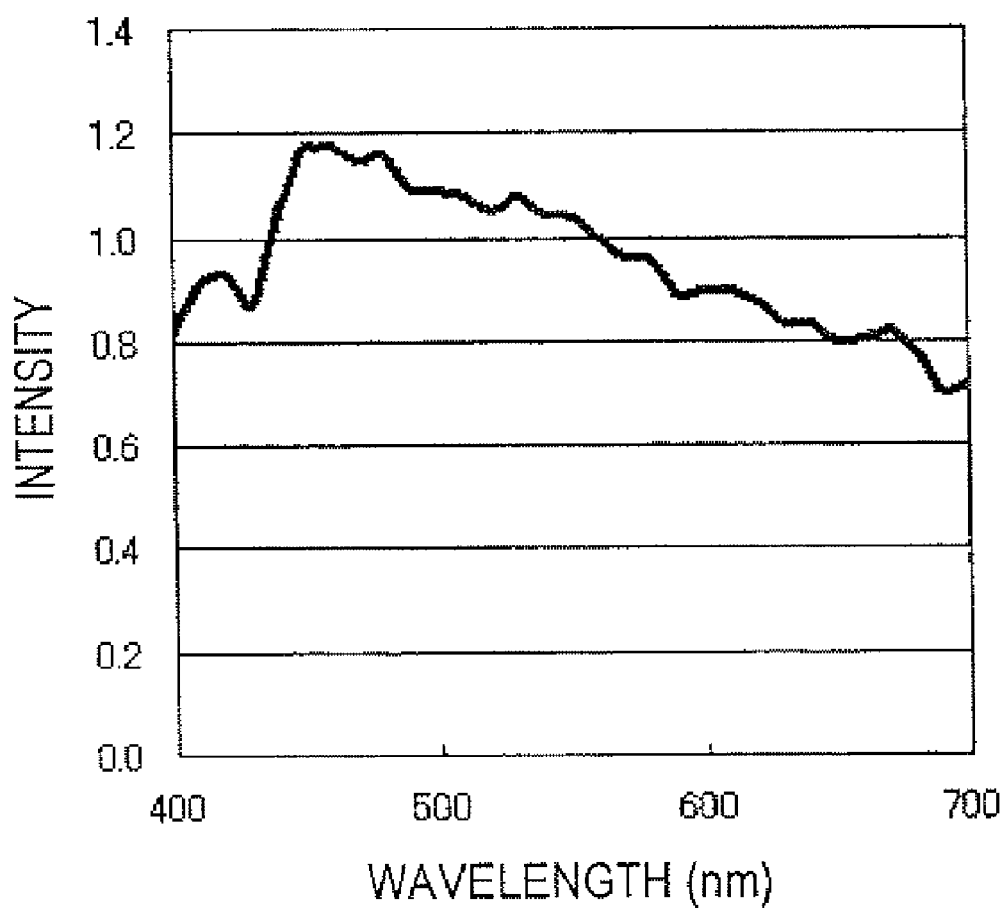
FIG. 8 is a graph illustrating the spectrum of external light (ambient light) used for reflection mode display.

Table 1 and FIG. 5 show examples (Examples 1 through 5) in which the white balance in the reflection mode display is adjusted by changing the area sizes of the reflection areas Rf. Table 1 shows the relationship of the area sizes of the reflection areas Rf of the red picture element R, the green picture element G, the blue picture element B and the yellow picture element Ye, with the color temperature and the xy chromaticity of white displayed in the reflection mode. FIG. 5 is an xy chromaticity diagram in which white displayed in the reflection mode in Examples 1 through 5 is plotted. Data shown herein is of an LCD which uses the following for the reflection mode display: a color filter having the spectrum characteristic shown in FIG. 6, a liquid crystal layer exhibiting the wavelength dependency of the transmitted light intensity shown in FIG. 7, and external light (ambient light) having the spectrum shown in FIG. 8.

TABLE 1

|  | Ex. 1 | Ex. 2 | Ex. 3 | Ex. 4 | Ex. 5 |
|---|---|---|---|---|---|
| Red | 1.0 | 1.0 | 1.0 | 1.0 | 0.8 |
| Green | 1.0 | 1.0 | 1.0 | 1.0 | 1.2 |
| Blue | 1.0 | 1.2 | 1.3 | 1.4 | 1.3 |
| Yellow | 1.0 | 0.8 | 0.7 | 0.6 | 0.7 |
| Color temperature | 3925 | 5041 | 6150 | 8101 | 7234 |
| x | 0.3905 | 0.3439 | 0.3197 | 0.2962 | 0.2947 |
| y | 0.4038 | 0.3523 | 0.3247 | 0.2975 | 0.3525 |

As shown in Table 1 and FIG. 5, in Example 1, the area sizes of the reflection areas Rf of the red picture element R, the green picture element G, the blue picture element B and the yellow picture element Ye are equal to one another. Therefore, the color temperature of white is low and white is slightly yellowish. By contrast, in Examples 2, 3 and 4, the area size of the reflection area Rf of the blue picture element B is larger than the area size of the reflection area Rf of the yellow picture element Ye. Therefore, the color temperature of white can be made higher. As understood from comparing Examples 2, 3 and 4, as the area size of the reflection area Rf of the blue picture element B is made larger with respect to the area size of the reflection area Rf of the yellow picture element Ye, the color temperature of white is raised. As understood from comparing Examples 3 and 5, the color temperature of white can be further raised by decreasing the area size of the reflection area Rf of the red picture element R in addition to making the area size of the reflection area Rf of the blue picture element B larger than the area size of the reflection area Rf of the yellow picture element Ye.

In this embodiment, as shown in FIG. 9(*a*), the mesh portion of each picture element meshes with a picture element belonging to the same pixel. The technology disclosed herein is not limited to this. As shown in FIG. 9(*b*), the mesh portion of each picture element may mesh with a picture element belonging to a different pixel.

In the structure shown in FIG. 9(*b*), each picture element is L-shaped and includes a mesh portion. The mesh portion of each picture element meshes with a picture element belonging to a different pixel, not with a picture element belonging to the same pixel. Specifically, the mesh portion of the red picture element R of a certain pixel meshes with the green picture element G belonging to a pixel below the certain pixel, and the mesh portion of the green picture element G of the certain pixel meshes with the red picture element R belonging to a pixel above the certain pixel. The mesh portion of the blue picture element B of the certain pixel meshes with the yellow picture element Ye belonging to a pixel below the certain pixel, and the mesh portion of the yellow picture element Ye of the certain pixel meshes with the blue picture element B belonging to a pixel above the certain pixel. With such a structure also, the above-described effect can be provided.

In the case where the picture elements are located such that the mesh portion of each picture element meshes with a picture element belonging to a different pixel, a white line on a black background can be displayed in a preferable manner regardless of the direction in which the line extends.

Figure 10:
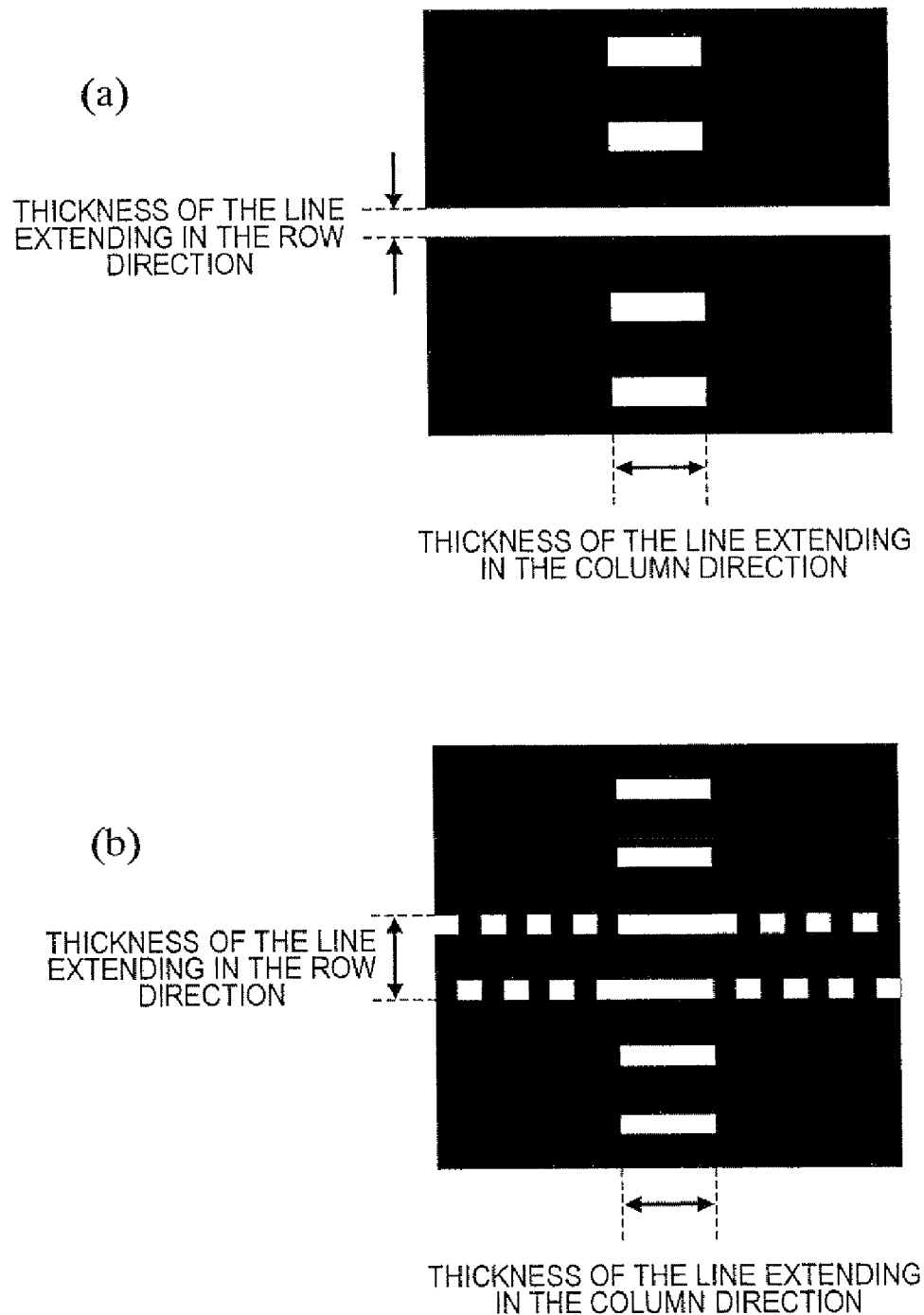
FIG. 10(a) schematically shows a white line displayed on a black background by the structure shown in FIGS. 9(a), and (b) schematically shows a white line displayed on a black background by the structure shown in FIG. 9(b).

In FIG. 9(*a*), the picture elements are located such that the mesh portion of each picture element meshes with a picture element belonging to the same pixel. In this case, the reflection areas Rf are arranged so as to be continuous like a strip in the row direction. Therefore, as shown in FIG. 10(*a*), a white line on a black background extending in the row direction and a white line on the black background extending in the column direction are displayed as having significantly different thicknesses.

By contrast, in FIG. 9(*b*), the picture elements are located such that the mesh portion of each picture element meshes with a picture element belonging to a different pixel. In this case, in one pixel, the reflection areas Rf are located at substantially the same distance from the center of the pixel. Therefore, as shown in FIG. 10(*b*), a white line on a black background extending in the row direction and a white line on the black background extending in the column direction are displayed as having substantially the same thickness. Thus, preferable display can be realized regardless of the direction in which the line extends.

Figure 11:
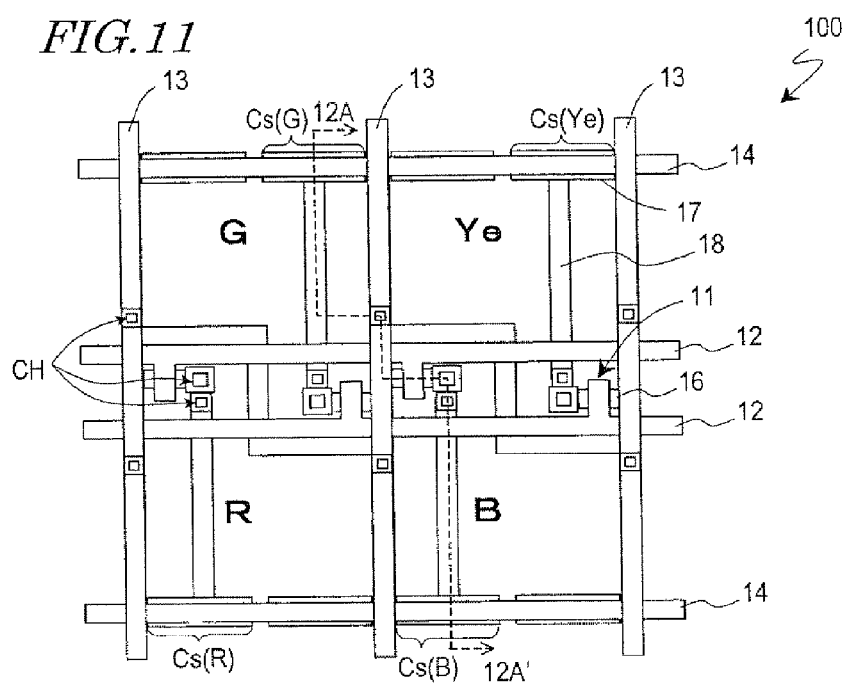
FIG. 11 is a plan view showing an exemplary specific structure of the LCD 100 according to an example embodiment of the technology disclosed herein.
Figure 12:
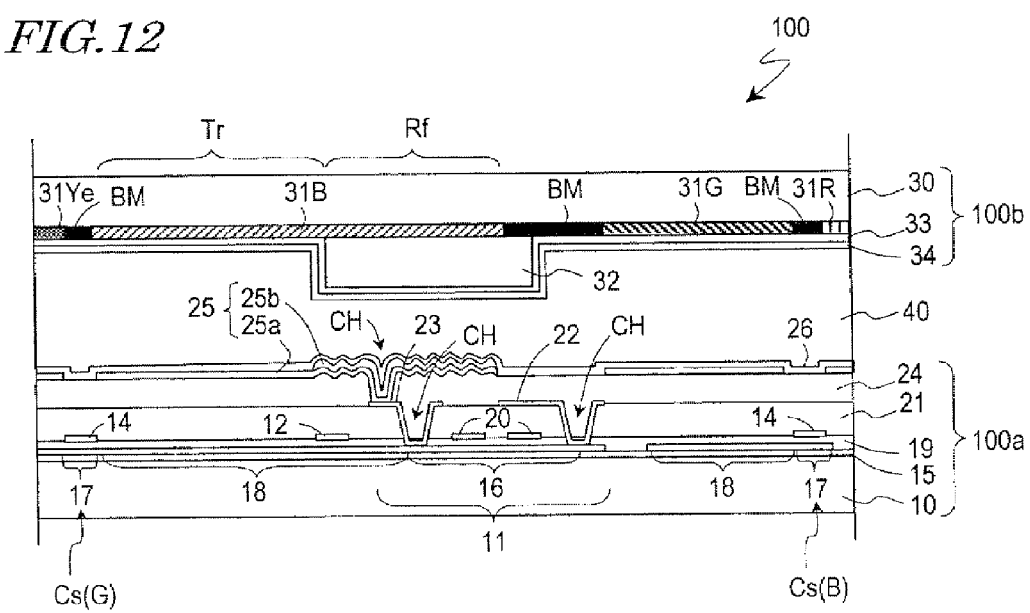
FIG. 12 is a cross-sectional view showing the exemplary specific structure of the LCD 100 according to an example embodiment of the technology disclosed herein, taken along line 12A-12A' of FIG. 11.

Next, a more specific structure of the LCD 100 in this embodiment will be described. FIG. 11 is a plan view showing an exemplary specific structure of the LCD 100, and FIG. 12 is a cross-sectional view taken along line 12A-12A' of FIG. 11. In FIG. 11, the reflection area Rf of each picture element is shown without hatching for a clearer appearance.

The LCD 100 includes an active matrix substrate (hereinafter, referred to as a "TFT substrate") 100*a* including a TFT 11 provided for each of a plurality of picture elements, a color filter 100*b* facing the TFT substrate 100*a*, and a liquid crystal layer 40 provided between these substrates.

The TFT substrate 100*a* has a structure in which many films are stacked on a transparent insulating plate (e.g., a glass plate) 10. Hereinafter, the structure of the TFT substrate 100*a* will be described more specifically.

First, a basecoat film 15 is formed so as to cover substantially the entirety of the insulating plate 10. Semiconductor layers 16 forming the TFTs 11, storage capacitance electrodes 17 each forming a storage capacitance, and storage capacitance connection lines 18 for electrically connecting the semiconductor layers 16 and the storage capacitance electrodes 17 are provided on the basecoat film 15. The semiconductor layers 16, the storage capacitance electrodes 17 and the storage capacitance connection lines 18 are formed of one, same semiconductor film.

A gate insulating film 19 is formed so as to cover the semiconductor layers 16, the storage capacitance electrodes 17 and the storage capacitance connection lines 18. The scanning lines 12, storage capacitance lines 14 and gate electrodes 20 extending from the scanning lines 12 are provided on the gate insulating film 19. The storage capacitance lines 14 face the storage capacitance electrodes 17 with the gate insulating film 19 provided therebetween. Each storage capacitance line 14, the corresponding storage capacitance electrode 17 and the gate insulating film 19 located therebetween form a storage capacitance Cs. In FIG. 11, the storage capacitances for the red picture element R, the green picture element G, the blue picture element B and the yellow picture element Ye are respectively represented as Cs(R), Cs(G), Cs(B) and Cs(Ye).

A first interlayer insulating film (e.g., an inorganic insulating film) 21 is formed so as to cover the scanning lines 12 and the like. The signal lines 13, source electrodes 22 and drain electrodes 23 are formed on the first interlayer insulating film 21. Each source electrode 22 and the corresponding drain electrode 23 are connected to the corresponding semiconductor layer 16 via a contact hole CH formed in the gate insulating film 19 and the first interlayer insulating film 21. As understood from FIG. 11 and FIG. 12, the drain electrodes 23 of two vertically adjacent picture elements extend parallel but are not collinear to one another.

A second interlayer insulating film (e.g., a transparent resin film) 24 is formed so as to cover the signal lines 13 and the like. Picture element electrodes 25 each including a transparent electrode 25a and a reflective electrode 25b are formed on the second interlayer insulating film 24. Each picture element electrode 25 is connected to the corresponding drain electrode 23 via a contact hole CH formed in the second interlayer insulating film 24. An alignment film 26 is formed so as to cover the picture element electrodes 25.

The color filter substrate 100b includes a transparent insulating plate (e.g., a glass plate) 30, and a red color filter 31R, a green color filter 31G, a blue color filter 31B, a yellow color filter 31Ye and a black matrix BM formed on the transparent insulating plate 30. On these color filters and the black matrix BM, a transparent dielectric layer (e.g., a transparent resin layer) 32 is selectively formed only in the reflection areas Rf. A counter electrode 33 and an alignment film 34 are provided so as to cover the transparent dielectric layer 32.

As the liquid crystal layer 40, various display modes of liquid crystal layer can be used. The transparent dielectric layer 32 selectively formed in the reflection area Rf forms a step in the color filter 100b. Because of this, the thickness of the liquid crystal layer 40 in the reflection area Rf and the thickness of the liquid crystal layer 40 in the transmission area Tr are different.

The LCD 100 having the structure shown in FIGS. 11 and 12 may be produced by any of various known production methods.

Thus, as shown at least in FIG. 11, an upper or second scanning line 12 is located between at least a part of a first picture element (e.g., the green picture element G) and the lower or first scanning line 12. Similarly, the first or lower scanning line 12 is located between at least part of a second picture element (e.g., the red picture element R) and the upper or second scanning line 12. Moreover, each of the TFTs 11 are located in the mesh portion.

FIG. 11 shows four picture elements and two scanning lines. The TFTs 11 for the two picture elements shown above (specifically, the green picture element G and the yellow picture element Ye) are connected to the lower scanning line 12, whereas the TFTs 11 for the two picture elements shown below (specifically, the red picture element R and the blue picture element B) are connected to the upper scanning line 12.

Figure 13:
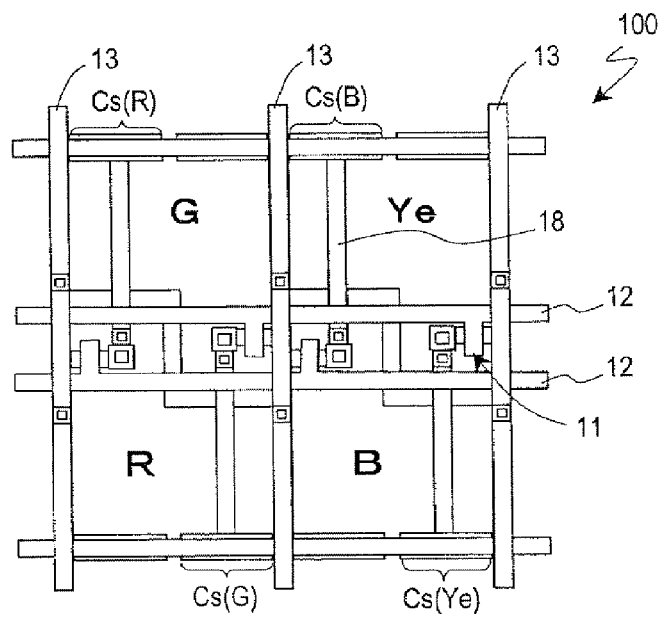
FIG. 13 is a plan view showing another exemplary specific structure of the LCD 100 according to an example embodiment of the technology disclosed herein.

In contrast to FIG. 11, as shown in FIG. 13, the TFTs 11 for the green picture element G and the yellow picture element Ye shown above may be connected to the upper scanning line 12, and the TFTs 11 for the red picture element R and the blue picture element B shown below may be connected to the lower scanning line 12.

With either structure, it is preferable that the storage capacitance connection line 18 for each picture element is located so as to extend below, not the scanning line 12 for driving this picture element, the scanning line 12 for driving the adjacent picture element, as shown in FIGS. 11 and 13. For example, regarding the red picture element R in FIG. 11, the storage capacitance connection line 18 for this red picture element R is located so as to extend below the scanning line 12 for driving the green picture element G (lower scanning line in the figure), not the scanning line 12 for driving the red picture element R (upper scanning line in the figure).

At a portion where the storage capacitance connection line 18 and the scanning line 12 cross each other, a parasitic capacitance is formed. Where the storage capacitance connection line 18 of each picture element extends below the scanning line 12 for driving this picture element, the parasitic capacitance causes a pull-in potential in a gate-off state, which influences the optimum counter electrode potential. For this reason, it is preferable that the storage capacitance connection line 18 of each picture element is located so as to extend below the scanning line 12 for driving the adjacent picture element.

With the structure shown in FIG. 13, in order to locate the storage capacitance connection line 18 of each picture element so as to extend below the scanning line 12 for driving an adjacent picture element, the storage capacitance is formed in the adjacent picture element. Specifically, the storage capacitance Cs(R) for the red picture element R is formed in the green picture element G, and the storage capacitance Cs(B) for the blue picture element B is formed in the yellow picture element Ye. The storage capacitance Cs(G) for the green picture element G is formed in the red picture element R, and the storage capacitance Cs(Ye) for the yellow picture element Ye is formed in the blue picture element B.

As shown in FIG. 13, where the storage capacitance connection line 18 extends across another picture element, a capacitance is formed between the picture elements. Therefore, after a signal is written in a picture element, pull-in occurs by the influence of the potential change in the adjacent picture element, and the voltage transmittance characteristic is shifted. As a result, a difference in the voltage transmittance characteristic is made between the two picture elements shown above (the green picture element G and the yellow picture element Ye) and the two picture elements shown below (the red picture element R and the blue picture element B).

Such a problem can be alleviated by setting γ for each of the red picture element R, the green picture element G, the blue picture element B and the yellow picture element Ye independently.

Even with the structure shown in FIG. 11, the inter-picture element capacitance may be dispersed among the picture elements to cause a difference in the voltage transmittance characteristic. In such a case also, γ may be set for each of the red picture element R, the green picture element G, the blue picture element B and the yellow picture element Ye independently.

In the above examples, as shown in FIG. 1 and the like, the mesh portions arranged like a strip are continuous in the order of the mesh portion of the red picture element R, the mesh portion of the green picture element G, the mesh portion of the blue picture element B and the mesh portion of the yellow picture element Ye. Thus, the reflection areas Rf are continuous in the order of red, green, blue and yellow in each picture element. The order of the mesh portions and the reflection areas Rf is not limited to this.

Figure 14:
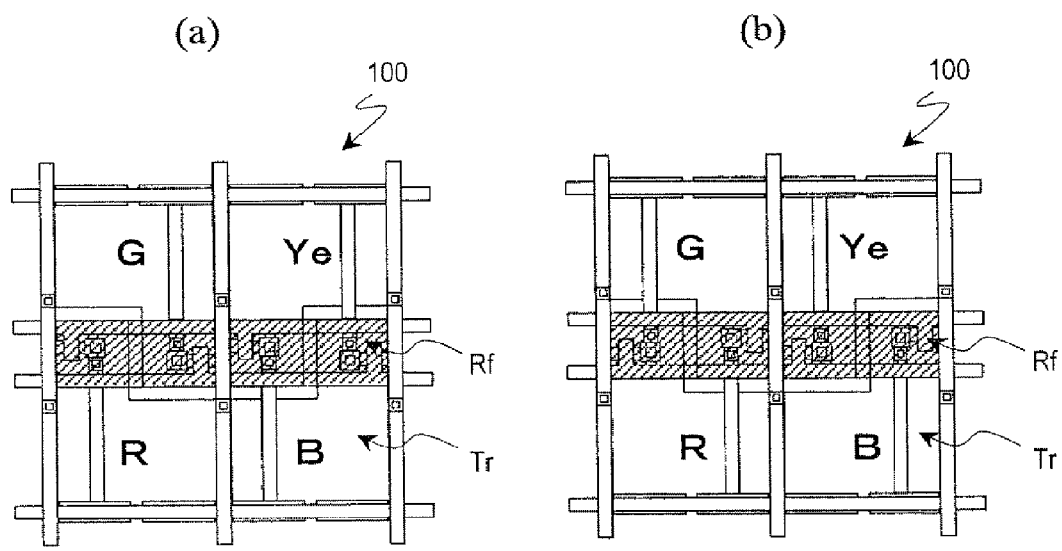
FIGS. 14(a) and (b) are each a plan view showing still another exemplary specific structure of the LCD 100 according to an example embodiment of the technology disclosed herein.

For example, as shown in FIGS. 14(a) and (b), the mesh portions may be continuous in the order of the mesh portion of the red picture element R, the mesh portion of the green picture element G, the mesh portion of the yellow picture element Ye and the mesh portion of the blue picture element B, and thus the reflection areas Rf of the picture elements may be continuous in the order of red, green, yellow and blue in each picture element.

In general, among the red picture element R, the green picture element G, the blue picture element B and the yellow picture element Ye, the red picture element R and the blue picture element B have a relatively low luminance, whereas the green picture element G and the yellow picture element Ye have a relatively high luminance. Therefore, where the reflection areas Rf are continuous in the order of red, green, blue and yellow in a picture element, the reflection areas Rf having a low luminance and the reflection areas Rf having a high luminance are alternately located as schematically shown in FIG. 15(a). Hence, a single-color image can be displayed uniformly.

By contrast, where the reflection areas Rf are continuous in the order of red, green, yellow and blue in a picture element, the reflection areas Rf having a high luminance are located at the center of the pixel as schematically shown in FIG. 15(b). Hence, when a white line on a black background or a black line on a white background is displayed, the line can be prevented from being edged with a different color.

The mesh portions may be arranged in the order of the mesh portion of the green picture element G, the mesh portion of the red picture element R, the mesh portion of the yellow picture element Ye and the mesh portion of the blue picture element B. With such an order, the reflection areas Rf are continuous in the order of green, red, yellow and blue in a picture element. Therefore, the reflection areas Rf having a low luminance and the reflection areas Rf having a high luminance are alternately located as schematically shown in FIG. 15(c). In this case also, the effect of displaying a single-color image uniformly can be provided.

Embodiment 2

Figure 16:
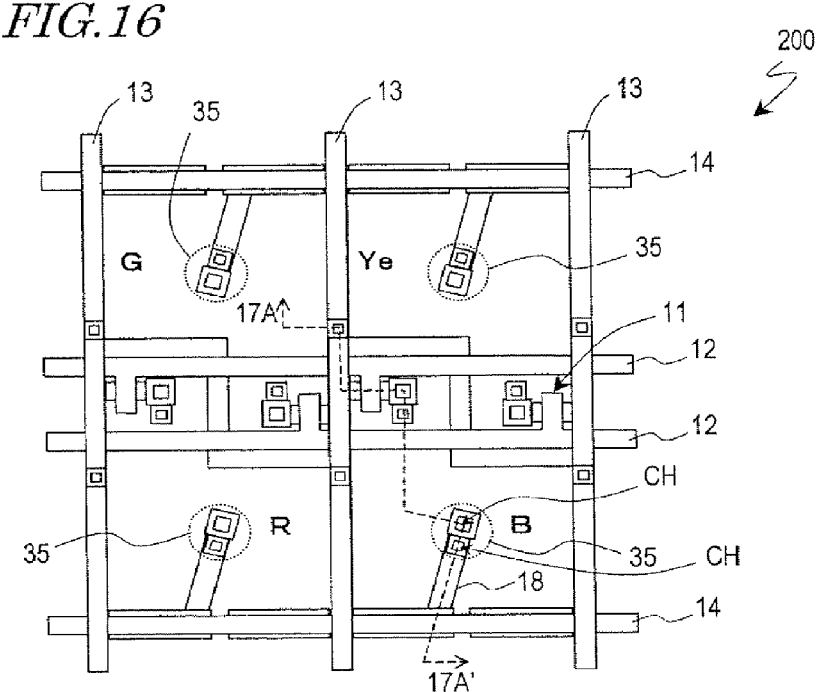
FIG. 16 is a plan view schematically showing another LCD 200 according to an example embodiment of the technology disclosed herein.
Figure 17:
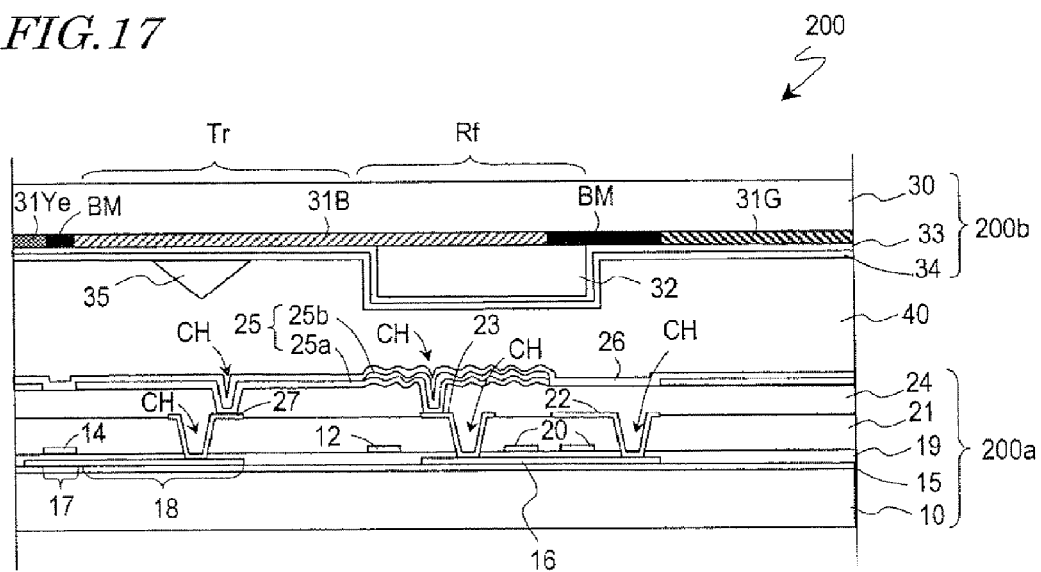
FIG. 17 is a cross-sectional view schematically showing the exemplary specific structure of the LCD 200 according to an example embodiment of the technology disclosed herein, taken along line 17A-17A' of FIG. 16.
Figure 18:
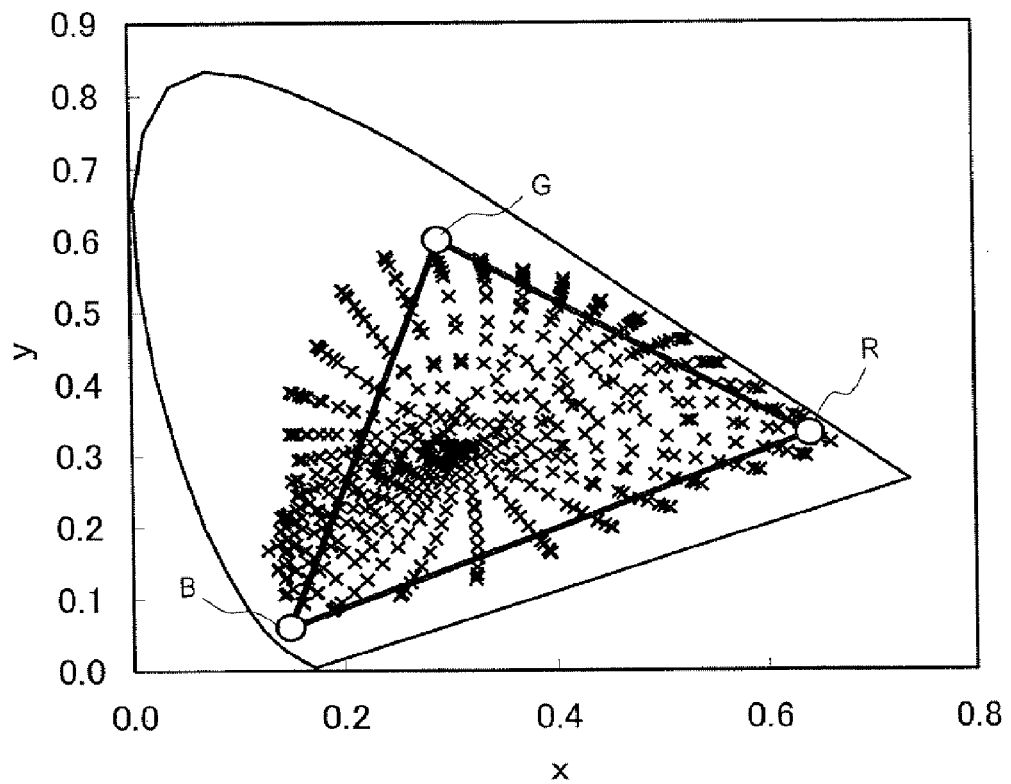
FIG. 18 shows a color reproduction range of a conventional LCD using three primary colors for display.
Figure 19:
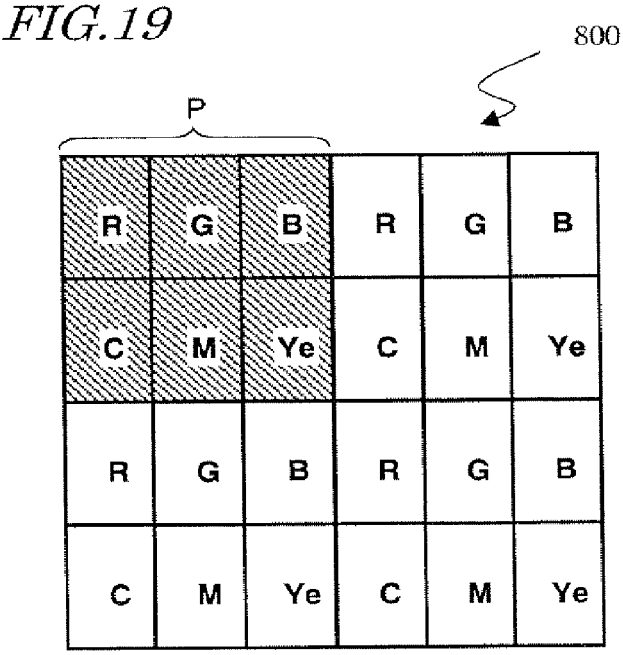
FIG. 19 schematically shows a conventional multiple color LCD 800.
Figure 20:
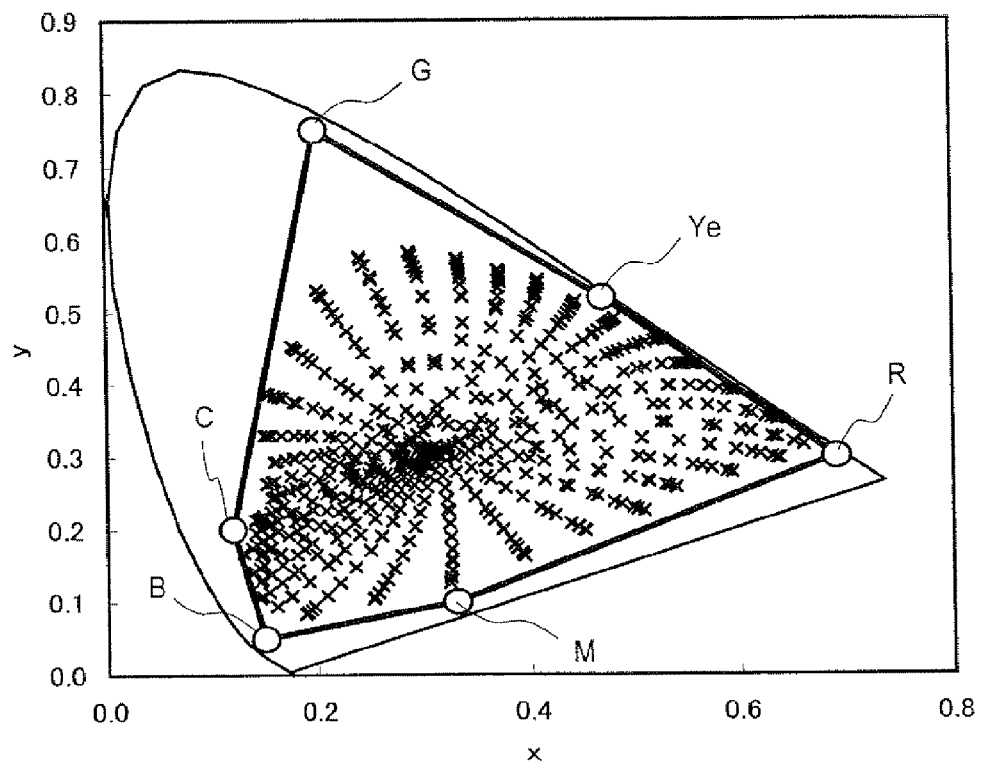
FIG. 20 shows a color reproduction range of the LCD 800.

With reference to FIGS. 16 and 17, an LCD 200 according to this embodiment will be described. FIG. 16 is a plan view schematically showing the LCD 200, and FIG. 17 is a cross-sectional view taken along line 17A-17A' of FIG. 16. Hereinafter, the LCD 200 will be described mainly regarding differences from the LCD 100 in Embodiment 1.

The LCD 200 according to this embodiment provides display in a CPA (Continuous Pinwheel Alignment) mode. In the CPA mode, an opening or a cut-out portion is provided in one of the electrodes facing each other with a vertical alignment type liquid crystal layer located therebetween. An oblique electric field generated at edges of the opening or the cut-out portion is used to radially orient liquid crystal molecules. Owing to this, high quality display with a wide viewing angle is realized. The CPA mode is disclosed in, for example, Japanese Laid-Open Patent Publications Nos. 2003-43525 and 2002-202511.

The picture element electrodes 25 provided in a TFT substrate 200a of the LCD 200 each have an opening and/or cut-out portion (neither is shown). When a voltage is applied between the picture element electrode 25 and a counter electrode 33, an oblique electric field is generated at edges of the opening or cut-out portion. The oblique electric field controls the direction in which liquid crystal molecules in the liquid crystal layer 40 are tilted when a voltage is applied. Therefore, in the liquid crystal layer 40, a plurality of areas in which the liquid crystal molecules are radially oriented are formed. Each of the areas thus formed is referred to as a "liquid crystal domain".

In this embodiment, projections (rivets) 35 for stabilizing the orientation of the liquid crystal domains are formed in the counter substrate 200b. The projections 35 are each provided at a position substantially corresponding to the center of the liquid crystal domain formed when a voltage is applied. The projections 35 are formed of, for example, a transparent resin.

In the LCD 100 shown in FIG. 11, the storage capacitance connection line 18 extending from the storage capacitance electrode 17 is directly connected to the semiconductor layer 16, and the storage capacitance connection line 18 extends across the picture element from the storage capacitance electrode 17 to the semiconductor layer 16.

By contrast, in this embodiment, the storage capacitance connection line 18 is connected to the semiconductor layer 16 via a conductive member 27, formed of the same conductive film as the source electrode 22 and the drain electrode 23, and the picture element electrode 25 and the drain electrode 23. The storage capacitance connection line 18 is formed on the conductive member 27 in a contact hole CH formed at a position overlapping the projection 35, and the conductive member 27 is connected to the picture element electrode 25 in a contact hole CH formed at a position overlapping the projection 35.

The storage capacitance connection line 18 is formed of a semiconductor film and so has a low light transmittance (e.g., about 50%). In this embodiment, the storage capacitance connection line 18 only needs to extend to a position overlapping the projection 35. Therefore, the reduction in the light transmittance caused by the storage capacitance connection line 18 can be suppressed, and brighter display can be realized. The liquid crystal layer in an area overlapping the projection 35 does not much contribute to display (having a low light transmittance) anyways. Therefore, the reduction in the transmittance caused by a contact hole formed in this area does not present any problem.

In Embodiments 1 and 2 described above, the technology disclosed herein has been described with multiple primary color LCDs in which display is provided using four or more primary colors. The technology disclosed herein is not limited to multiple primary color LCDs, and is widely usable for transreflective LCDs in which one pixel is defined by four or more picture elements.

For example, the technology disclosed herein is usable for an LCD in which one pixel is defined by four picture elements, i.e., a red picture element for displaying red, a green picture element for displaying green, a blue picture element for displaying blue and a white picture element for displaying white. Where the three picture elements for displaying the three primary colors are combined with a white picture element for displaying white, the luminance of each pixel is increased and still brighter display can be realized.

INDUSTRIAL APPLICABILITY

According to the technology disclosed herein, a structure for a transreflective liquid crystal display device in which one pixel is defined by four or more picture elements, the structure providing provides a high aperture ratio and being is suitable for display for which the transmission mode is prioritized, can be realized.

The technology disclosed herein is preferably usable for a transreflective liquid crystal display device in which one pixel is defined by four or more picture elements and also for a multiple primary color liquid crystal display device providing display using four or more primary colors.

The invention claimed is:

1. A liquid crystal display device comprising:
   plural picture elements including a first picture element and a second picture element;
   plural switching elements including a first switching element electrically connected to the first picture element and a second switching element electrically connected to the second picture element;
   plural scanning lines including a first scanning line electrically connected to the first switching element and a second scanning line electrically connected to the second switching element;
   wherein the second scanning line is located between at least part of the first picture element and the first scanning line; and
   wherein the first scanning line is located between at least part of the second picture element and the second scanning line.

2. The liquid crystal display device of claim 1, wherein the second scanning line is located between a majority of the first picture element and the first scanning line, and the first scanning line is located between a majority of the second picture element and the second scanning line.

3. The liquid crystal display device of claim 1, further comprising:
   plural storage capacitance lines including a first storage capacitance line forming a capacitance with the first picture element and a second storage capacitance line forming a capacitance with the second picture element;
   wherein the first scanning line and the second scanning line are located between the first storage capacitance line and the second storage capacitance line.

4. The liquid crystal display device of claim 1, further comprising:
   an insulating layer located between the plural picture elements and the plural switching elements;
   wherein the first switching element includes a first drain electrode and the second switching element includes a second drain electrode; and
   wherein the insulating layer includes at least two contact holes configured to facilitate electrical connection of the first picture element to the first drain electrode and the second picture element to the second drain electrode.

5. The liquid crystal display device of claim 1, wherein the first drain electrode and the second drain electrode extend parallel but not collinear to each other.

6. The liquid crystal display device of claim 1, wherein the first picture element and the second picture element display different colors from one another.

7. The liquid crystal display device of claim 1, wherein the plural picture elements include a third picture element and a fourth picture element each for displaying different colors.

8. The liquid crystal display device of claim 1, wherein each of the plural picture elements includes a protruding portion shaped to be meshable with an adjacent picture element.

9. The liquid crystal display device of claim 1, wherein each of the plural picture elements includes a transmission area for providing display in a transmission mode and a reflection area for providing display in a reflection mode.

10. The liquid crystal display device of claim 1, wherein each of the plural picture elements includes a mesh portion shaped to be meshable with an adjacent picture element.

11. The liquid crystal display device of claim 10, wherein the plural picture elements are each L-shaped.

12. The liquid crystal display device of claim 10, wherein the plural picture elements define plural pixels each including the first picture element, the second picture element, a third picture element and a fourth picture element.

13. The liquid crystal display device of claim 12, wherein the mesh portion of each of the plural picture elements meshes with a picture element belonging to a same pixel.

14. The liquid crystal display device of claim 12, wherein the mesh portion of each of the plural picture elements meshes with a picture element belonging to a different pixel.

15. The liquid crystal display device of claim 12, wherein the first picture element is a red picture element for displaying red, the second picture element is a green picture element for displaying green, and the third picture element is a blue picture element for displaying blue.

16. The liquid crystal display device of claim 15, wherein the fourth picture element is a white picture element for displaying white.

17. The liquid crystal display device of claim 12, wherein among the first picture element, the second picture element, the third picture element and the fourth picture element, two picture elements display colors in a complementary relationship to each other; and the mesh portions of the two picture elements mesh with each other.

18. The liquid crystal display device of claim 15, wherein the fourth picture element is a yellow picture element for displaying yellow.

19. The liquid crystal display device of claim 18, wherein the mesh portion of the blue picture element and the mesh portion of the yellow picture element mesh with each other.

20. The liquid crystal display device of claim 18, wherein the red picture element, the green picture element, the blue picture element and the yellow picture element are arranged in a matrix of 2 rows and 2 columns; and the mesh portion of the red picture element, the mesh portion of the green picture element, the mesh portion of the blue picture element and the mesh portion of the yellow picture element are arranged to be continuous like a strip in a row direction.

21. The liquid crystal display device of claim 20, wherein the mesh portions arranged to be continuous like a strip are continuous in the order of the mesh portion of the red picture element, the mesh portion of the green picture element, the mesh portion of the blue picture element and the mesh portion of the yellow picture element; or in the order of the mesh portion of the green picture element, the mesh portion of the red picture element, the mesh portion of the yellow picture element and the mesh portion of the blue picture element.

22. The liquid crystal display device of claim 20, wherein the mesh portions arranged to be continuous like a strip are continues in the order of the mesh portion of the red picture element, the mesh portion of the green picture element, the mesh portion of the yellow picture element and the mesh portion of the blue picture element.

* * * * *